- VARNISH OR LACQUER
- POLYVINYL CHLORIDE
- WIRE NET
- PERBUNAN
- WIRE NET

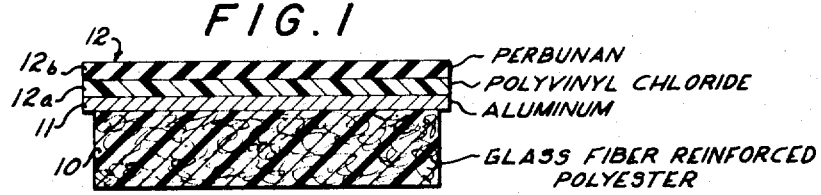
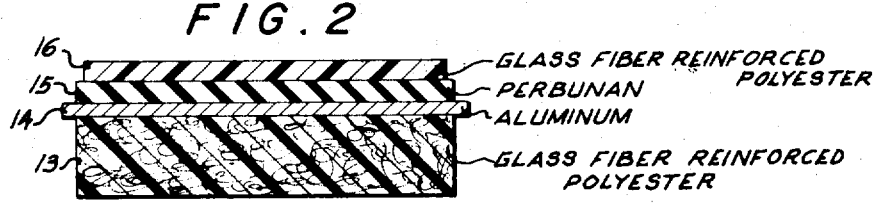
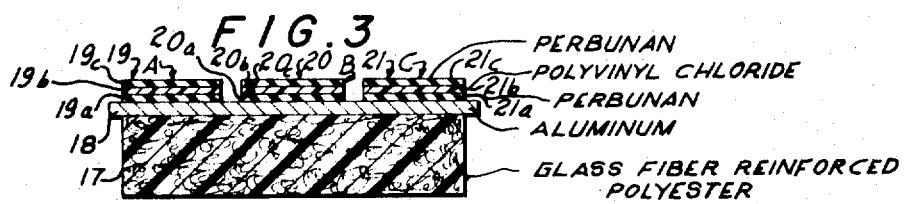
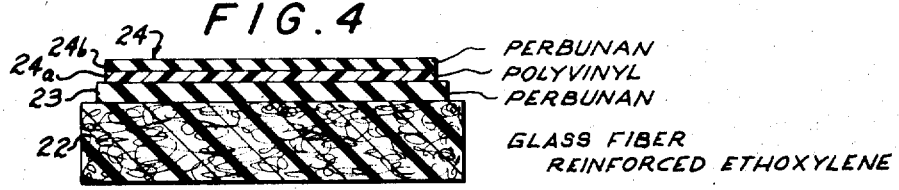
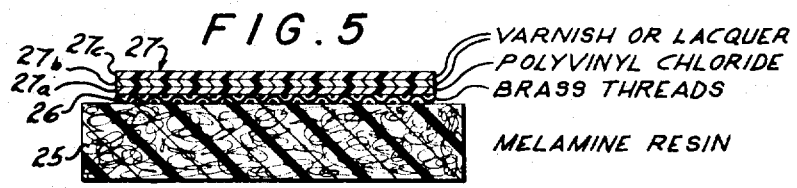

- GLASS FIBER
- PLASTIC

ROD — ADHESIVE

- PLASTIC WITH GLASS FIBERS
- GLUE OR CEMENT
- GLASS FIBER REINFORCED RODS

- PERBUNAN
- POLYVINYL CHLORIDE
- PERBUNAN
- PLASTIC WITH ABSORBER PROPERTIES
- GLASS FIBER REINFORCED PLASTIC
- PLASTIC WITH ABSORBER PROPERTIES
- METAL

ADHESIVE

United States Patent Office 3,454,947
Patented July 8, 1969

3,454,947
RADAR-PROOF AND SHELL-PROOF
BUILDING MATERIAL
Ludwig Wesch, Heidelberg, and Kurt Ullrich, Heidelberg-Ziegelhausen, Germany, assignors to Eltro GmbH & Co., Heidelberg, Germany
Continuation-in-part of application Ser. No. 855,469, Nov. 25, 1959. This application July 17, 1967, Ser. No. 653,982
Claims priority, application Germany, Dec. 13, 1958, E 16,874; July 3, 1959, E 17,884
Int. Cl. G01s 7/36
U.S. Cl. 343—18    4 Claims

ABSTRACT OF THE DISCLOSURE

A structural member also capable of absorbing electromagnetic energy to avoid detection by radar and having sufficient strength to resist shelling. These results are obtained by using cooperating layers operative to give absorption and physical strenth.

---

This inevntion relates to building materials having radar-proof characteristics and high mechanical strength. This application is a continuation-in-part application of my earlier filed application, Ser. No. 855,469, filed Nov. 25, 1959 now abandoned.

In numerous practical instances, absorbers of electromagnetic energy from a radar source can be used most favorably if they are of the thin-walled and broad-band kind.

An exceptional problem of special importance is the provision of thick-walled building material with electromagnetic wave absorption properties simultaneously combining high-frequency wave absorption properties from a radar source with those of a good shell-proof material. This problem exists because it is normally impossible to combine good mechanical characteristics with good high-frequency absorption properties since the demands on the composition of the material used are different ones.

The material according to the invention solves the problem of providing for extremely severe mechanical and high-frequency requirements while at the same time eliminating magnetic effects.

A normal building material to meet average safety demands with respect to the effects of shell and fragments on ships and the like is, for example, a 7 mm. steel plate. This type of steel plate is very heavy and has extremely strong magnetic effects. In addition, this material is an excellent reflector of electromagnetic waves from a radar source and thus constitutes an excellent radar target.

In contradistinction to known materials, the present invention proposes to avoid the use of full metallic surfaces and known combinations of metallic layers and plastic layers or plastic layers alone, and contemplates the provision of a sequence of layers of plastic or synthetic materials with metallic inserts and/or metallic wire nets or the like, which singly or in combination contain absorbers of electromagnetc waves generated from a radar source.

It is advisable, for mechanical reasons, that the sequence of layers of plastic or synthetic materials and metallic inserts and/or wire nets be so constructed that a hard plastic material alternates with a soft plastic material. The scope of the material employed will become apparent hereinafter.

This kind of structure permits meeting all mechanical requirements and the producing of a material which combines desired electromagnetic wave absorbing properties with the desired mechanical properties.

Further objects, features and advantages of the invention will become apparent from the detailed description which follows and the accompanying drawing in which:

FIGURE 1 is a side view of building material provided in accordance with one embodiment of the invention, the view illustrating the layers of said materials;

FIGURE 2 illustrates in side view and in section a second embodiment of the invention;

FIGURE 3 illustrates in side view and in section an embodiment of the invention esepcially adapted for increasing effective band width;

FIGURE 4 illustrates in side view and in section a further embodiment of the invention;

FIGURE 5 illustrates in side view and in section an embodiment of the invention employing a metallic element;

Figure 6:
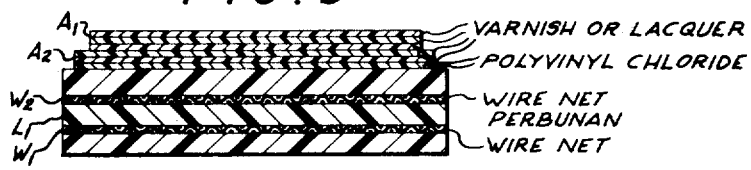
FIGURE 6 illustrates in side view and in section a development of the embodiment of FIG. 5.

In one of its simplest forms, building material of the invention is constructed in the manner shown in FIG. 1. The base is a plastic layer having a thickness of 20 mm. and which is constituted, for example, of epoxy resins, polyvinyl chloride (PVC), polyester, rubbers which are vulcanized with high sulfur content, or, quite generally, plastic material. Plastic layer 10 is superposed by a 3 mm. aluminum layer 11, and above this aluminum layer is a $\lambda/4$ absorber layer 12 including sections 12a and 12b.

The 20 mm. plastic layer 10 can be split up into separate partial layers and can at the same time be provided with metal foils or wire nets having preferably a mesh width of 0.5 to 5 mm. and a wire thickness of 0.08 to 1 mm.

For bonding purposes it is advantageous to coat the aluminum plate, the metallic foils and/or wire nets, if used with an adhesive varnish. For the plastic layers, particularly when natural and/or synthetic rubber is used, good results are obtained with Desmodur/Desmophen mixtures.

Desmodur/desmophen varnishes are condensation products (manufactured by Bayer, Leverkusen, Germany) which condense after combination of the components with concurrent elimination of water. The Desmodur components is triisocyanate of leukorosanile. Many chemically different Desmophen components are commercially available, the mechanical strength of the lacquer depending essentially on the nature of the latter component. Following is an illustrative list of the Desmophen esters of adipic acid.

Desmophen:
    200=3 adipic acid+phthalic acid+8 1,2,4-butanetriol,
    300=3 adipic acid+4 1,2,4-butanetriol+1 xylene formaldehyde resin,
    800=5 adipic acid+1 phthalic acid+8 1,2,4-butanetriol,
    900=3 adipic acid+4 1,2,4-butanetriol 1100=3 adipic acid+2 1,2,4-butanetriol+2 butylene glycol,
1200=3 adipic acid+1 1,2,4-butanetriol+3 butylene glycol (ethylene glycol monobutyl ether).

The condensation products containing the Desmophen components become increasingly softer the higher the characteristic number of the Desmophen. The reaction between the Desmophen and Desmodur components is a two-step process, the hydroxy radicals reacting with the isocyanate to form urethanes under elimination of water and the excess isocyanate then reacting with the water formed in the first step to separate $CO_2$ whereby a foam-like substance is formed. Furthermore, the excess isocyanates may form thermoplastic substances with the glycols.

The $\lambda/4$ absorber, the aluminum layer and the plastic are pressed in a single operation. The material has the mechanical properties of a 7 mm. steel plate and has, as well, the above-indicated electromagnetic wave absorption advantages.

Another example, shown in FIG. 2, is constructed of a plastic layer 13, an aluminum layer 14 and an adsorber consisting of two sequentially arranged $\lambda/4$ absorber layers 15 and 16.

Said $\lambda/4$ absorber layers 15 and 16 are preferably formed of a combination of rubber, Buna or Perbunan materials; the first $\lambda/4$ absorber layer, which is made of materials having a low dielectric constant and may be PVC.

FIG. 3 shows another material constituting a broadband absorber. In this case, $\lambda/4$ absorbers A, B and C are superposed on aluminum layer 18, said $\lambda/4$ absorbers being tuned to different wavelengths. This arrangement produces a broad-band layer which results in a good absorption in a wavelength range of, for example, from 2 to 10 cm. All of the absorbers A, B and C can be provided with a common covering layer if desired.

All of the $\lambda/4$ absorbers according to the invention can advantageously be produced with a phase-shifting base and at least one layer of high absorption material.

It is also possible to use a 377 ohm layer, which is constructed on a $\lambda/4$ layer having a low dielectric constant. An arrangement may be provided consisting of a $\lambda/4$ supporting layer, a semi-conducting layer and a superjacent wave absorbent.

The wave absorbent should have the property of producing a reflection-free transition between the wave resistance of the free space and the wave resistance of the absorber. This can be accomplished if the wave absorbent is split up into at least two partial layers. For their technical construction, well known laws for an exponential line or conductor are used.

The material may also be characterized in that absorbent dipoles or dipole lines (tier arrays, co-linear arrays) are used on a $\lambda/4$ layer having a low dielectric constant.

It has been found that, for the purpose of reducing the weight and also for increasing band-width, when using two $\lambda/4$ layers (according to FIG. 2) or at least two $\lambda/4$ layers in juxtaposition, different types of absorbers may be used.

In order further to reduce weight and also to improve high-frequency properties, the aluminum layer can be replaced by a metal-substitute layer. The metal-substitute layer should be composed of a material having a very high dielectric constant and may be, for example, Perbunan, which is filled with graphite and/or conductive carbon black and/or semi-conductors. It is, however, also possible to use, for example, a 20 mm. plastic layer as a substitute layer. This makes it possible to reduce substantially the degree of filling of the metal-substitute layer; for example, whereas the metal-substitute layer must, as a thin layer, have a relative dielectric constant, $\epsilon=100$, it is possible to reduce $\epsilon$ to 10 in thicker layers.

For the purpose of increasing the mechanical strength, wire nets can be incorporated into the plastic material. These wire nets produce a favorable effect in the metal-substitute layer. Several wire nets may, for example, be arranged in such a manner that, from a high-frequency viewpoint, a greater width of mesh is used toward the outside and becomes increasingly narrow toward the side facing away from the impinging wave, as is shown in FIG. 6. The nets can be considered, from a high-frequency viewpoint, as self-induction elements, and their effect can be calculated according to known laws, the result being a reduction of the total absorber thickness. FIG. 5 shows the possibility of replacing the metal-substitute layer directly with a wire net. In this case it is necessary that the width of mesh of the wire net be smaller than $\lambda/5$ $\lambda$ being the wavelength of the energy to be absorbed.

An all-purpose absorber constructed as shell-proof as possible has, in the most favorable case, the structure according to FIG. 6, in which case all mechanical requirements can be met to the highest degree. The wire nets W1 and W2 may either be vulcanized into the metal-substitute layer L1 or may be cast into the plastic material. Absorber layers A1 and A2 are superposed on layer 1.

The selection of the plastic material used in structures of the invention depends only on the mechanical requirements, since it is possible appropriately to adjust, in each particular case, the high-frequency requirements, reduced due to the thickness, by controlling the degree of filling with different inorganic fillers or fillers of purely metallic character or by fillers on a carbon black or graphic base. It has also been found advantageous to replace the first metal-substitute layer by a softer material, the second metal-substitute layer, by a harder material, and the third metal-substitute layer, again by a softer material. This produces, in cooperation with the wire nets which are preferably made of bronze wires, and, if magnetic effects do not matter, of steel wires or of brass-plated steel wires, a substantial reduction of self-fragmentation, which is important should such building material be subject to destruction by external action. A multilayer absorber also offers the possibility of allowing thermoplastic and vulcanization products to alternate in the individual layers and of thereby obtaining absolute adhesion of all separate elements while producing said absorber in a single operation.

The building material of the invention results in a substantially technical improvement, since the high-frequency properties meet all requirements and since the weight of the entire absorber is at most equal to that of a corresponding steel plate and will, in most cases, be substantially lighter. There is the additional advantage that the properties, both in the event of shelling and in the event of fragmentation, are substantially more favorable than in previously used materials.

As far as its ultimate use is concerned, the building material of the invention is suitable in ship-building industry, for submarine conning tower structures and the like, and wherever it is important to combine microwave absorption properties with good mechanical properties and light weight. This includes aircraft, armored vehicles and the like.

Some specific examples of plates provided in accordance with the invention next follow:

EXAMPLE 1

In FIG. 1, layer 10 is composed of polyester reinforced by glass fiber constituted by 60 laminates of glass-silk fabric with a thread diameter of $9\mu$ and a weight of 300 g./sq. m. Layer 10 is 20 mm. thick. Layer 11 is aluminum and is 3 mm. thick.

Layer 12 is composed of two partial layers: namely, layer 12a which is a phase-shifting layer having a low relative dielectric constant of 2.5, and which is 1.5 mm. thick and composed of polyvinyl chloride; and layer 12b, which is an absorber layer, 0.8 mm. thick and composed as follows:

| | Parts by weight |
|---|---|
| Perbunan (a copolymer of butadiene and acrylonitrile. Perbunan is a trade mark of Bayer, Leverhusen, Germany) | 10.00 |
| Magnetite | 76.00 |
| Triisocyanate of leukorosaniline | 0.90 |
| $Z_nO$ | 0.50 |
| Stearic acid | 0.60 |
| Paraffin | 0.40 |
| Sulfur | 0.40 |
| Coumarone-indene resin | 2.00 |
| Diphenylguanidine | 0.20 |

EXAMPLE 2

In FIG. 2, layer 13 is polyester reinforced with glass fiber, composed of 60 laminates of glass-silk fabric, with a thread diameter of 9μ and a weight of 300 g./sq. m. Layer 13 is 20 mm. thick. Layer 14 is aluminum and is 3 mm. thick. Layer 15 is an absorber layer, 2 mm. thick, composed as follows:

| | Parts by weight |
|---|---|
| Perbunan | 19.00 |
| Magnetite | 76.00 |
| Triisocyanate of leukorosaniline | 0.90 |
| $Z_nO$ | 0.50 |
| Stearic acid | 0.60 |
| Paraffin | 0.40 |
| Sulfur | 0.40 |
| Coumarone-indene resin | 2.00 |
| Diphenylguanidine | 0.20 |

Layer 16 is polyester reinforced with glass fiber, composed of 60 laminates of glass-silk fabric, with a thread diameter of 9μ and a weight of 300 g./sq. m. The layer is 6 mm. thick and the radar absorber is effective in the 3–5 cm. band.

EXAMPLE 3

In FIG. 3, layer 17 is a polyester reinforced with glass fiber, composed of 60 laminates glass-silk fabric, with a thread diameter of 9μ and a weight of 300 g./sq. m. Layer 17 is 20 mm. thick. Layer 18 is aluminum 3 mm. in thickness. Layer 19 and layer 21 are identical and are composed of three partial layers: namely, partial layers 19a and 21a which are metal-substitute layers identical with layer 23 in FIG. 4, hereinafter defined in Example 4, layers 19b and 21b which are polyvinyl chloride layers of 1.5 mm. thickness, and layers 19c and 21c which are absorber layers, 0.8 mm. thick, composed as follows:

| | Parts by weight |
|---|---|
| Perbunan | 19.00 |
| Magnetite | 76.00 |
| Triisocyanate of leukorosaniline | 0.90 |
| $Z_nO$ | 0.50 |
| Stearic acid | 0.60 |
| Paraffin | 0.40 |
| Sulfur | 0.40 |
| Coumarone-indene resin | 2.00 |
| Diphenylguanidine | 0.20 |

Layer 20 again consists of three partial layers: namely, layer 20a which is a metal-substitute layer, layer 20b which is a polyvinyl chloride layer 2 mm. thick, and layer 20c which is an absorber layer 1.3 mm. thick, composed as follows:

| | Parts by weight |
|---|---|
| Perbunan | 19.00 |
| Magnetite | 76.00 |
| Triisocyanate of leukorosaniline | 0.90 |
| $Z_nO$ | 0.50 |
| Stearic acid | 0.60 |
| Paraffin | 0.40 |
| Sulfur | 0.40 |
| Coumarone-indene resin | 2.00 |
| Diphenylguanidine | 0.20 |

Layers 19 and 21 are tuned to the 3 cm. band, and layer 20 is matched with the 5.5 cm. band.

EXAMPLE 4

In FIG. 4, layer 22 is a layer of ethoxylene resin material derived from Bisphenol A and epichlorohydrin. Layer 22 is reinforced with glass fiber, composed of 60 laminates glass-silk fabric, with a thread diameter of 9μ and a weight of 300 g./sq. m. The layer 22 is 20 mm. in thickness.

Layer 23 is a metal-substitute layer, as are layers 19a, 20a and 21a of Example 3, and these layers are composed as follows:

| | Parts by weight |
|---|---|
| Perbunan | 28.24 |
| Graphite | 30.00 |
| Conductivity carbon black | 28.50 |
| Triisocyanate of leukorosaniline | 0.90 |
| Mineral oil softener for rubber, such as dibutyl phthalate | 6.0 |
| Stearic acid | 0.90 |
| Paraffin | 0.60 |
| Coumarone-indene resin | 2.00 |
| $Z_nO$ | 0.75 |
| Sulfur | 0.60 |
| Dibenzothiacyldisulfide | 1.05 |
| Diphenylguanidine | 0.45 |

The thickness of the metal-substitute layers are regulated as discussed hereinbefore. In the particular examples shown, layers 23, 19a, 20a and 21a have dielectric constants of $\epsilon = 100$ and are 2 mm. in thickness.

Layer 24 is composed of two partial layers: namely, layer 24a of polyvinyl chloride, 2 mm. thick, and layer 24b, which is an absorber layer 1.2 mm. thick, composed as follows:

| | Parts by weight |
|---|---|
| Perbunan | 19.00 |
| Magnetite | 76.00 |
| Triisocyanate of leukorosaniline | 0.90 |
| $Z_nO$ | 0.50 |
| Stearic acid | 0.60 |
| Paraffin | 0.40 |
| Sulfur | 0.40 |
| Coumarone-indene resin | 2.00 |
| Diphenylguanidine | 0.20 |

EXAMPLE 5

In FIG. 5, layer 25 is melamine resin of a thickness of 20 mm. Wire net 26 is of brass, with a wire diameter of 0.1 mm. The distance between the wires is 1 mm., and the wires are interlaced at right angles to one another.

Layer 27 is composed of three partial layers: namely, layer 27a which is a polyvinyl chloride layer 2 mm. thick, layer 27b which is a varnish or lazquer layer of 20–50 parts of Desmodur/Desmophen in a weight ratio of 9:1 plus 50–80 parts of γ $Fe_2O_3$ or other suitable high-frequency ferromagnetic material which is effective in the desired wave range; and layer 27c which is a varnish layer 1 mm. thick of the same composition as layer 27b.

It has also been found that a substantially higher mechanical strength can be imparted to the building material of the invention by reinforcing at least one of the plastic layers such as 10, 13, 17, 22 and 25 with glass fibers and/or thin metal threads, and especially iron threads having a thickness of between 1μ to 100μ.

The simplest embodiment of the plastic material to be used in accordance with the invention comprises glass fibers and/or metal threads loosely distributed or in the form of special layers of fabric, and especially of glass-silk fabrics.

According to one embodiment of the invention, the building material consists of narrow rods or elements obtained by vertical cuts from a plastic plate reinforced in the above-described manner, in which case the width and height and possibly the number of the embedded layers or laminates depend on the desired dielectric and breaking strength of the building material and, in the case of plastic layers with high-frequency losses, also on the demands to be made with respect to electromagnetic wave absorption. These rods are bound together, and preferably cemented, and thus serve to produce a reinforced plastic plate.

In constructing the building material according to the invention, it is also possible to superpose advantageously two or more of such plates composed of narrow rods in such a manner that the directions of the rods of two superjacent plates overlap crosswise. This further increases the strength of the material.

Under a plastic layer with high-frequency losses which serves as a substitute for a metallic insert and which itself gives a certain absorber effect and which has been reinforced according to the invention, a second "metal-substitute layer" of the same kind may be placed to obtain a multi-circuit absorber, the effectiveness of which ranges over the wavelength field from, for example, 3 to 50 cm. This method of constructing a plastic layer according to the invention produces, in addition to an excellent radar absorber, a substantial increase of the mechanical and dielectric strength of the building material.

There are two preferred processes for producing building plates according to this latter aspect of the invention: either th efully constructed building plate is pressed and fastened in a single operation, or else the individual layers are first finished and are glued on top of each other in hardened condition. This latter process is particularly suitable if the plates to be used need not be plane, and if any kind of curved surface is to be produced.

As far as manufacturing and engineering problems are concerned, the building plates according to the invention, even those of complicated structures, can be produced without difficulties in large quantities. The plastic and plywood industries are familiar with the necessary machines, such as presses and cutters.

The plastics most suited for these plates are polyesters, ethoxylene and melamine resins which can be hardened after deformation. Such polyesters may be constituted of high molecular hydrophobic isophthalic polyester resins.

The actual microwave absorber layer which, in turn, may consist of several partial layers, is placed on a foundation or base formed of the above-mentioned plastic plates.

The layers of reinforced plastic used according to the invention for the base or foundation of the electromagnetic wave absorber, are shown in FIGS. 7 to 10. FIG. 11 shows, by way of example, radar- and shell-proof building material of a complicated structure for which the foundation according to FIGS. 7 to 10 is used.

Figure 7:
FIGURE 7 illustrates in side view and in section a metal-substitute layer.

FIG. 7 shows the basic structure of a glass-fiber reinforced building plate, in which glass-silk fabrics $a$ or instead, all kinds of rovings in one or several layers, are embedded in a suitable plastic material $b$, such as, for example, polyester, ethoxylene or melamine resin. Especially advantageous are glass-silk fabrics, the thread of which has a diameter of $9\mu$ and the weight of which amounts to about 300 g./sq.m. A building plate of this kind of 2 cm. thickness contains approximately 60 laminates of such glass-silk fabric. To simplify the drawing, FIG. 7 shows only 3 laminates. The glass fabrics or rovings are introduced into the plastic in a manner known per se, whereupon the building plate is hardened under pressure and at elevated temperature (50–120° C.).

The glass fiber reinforced plastic plate produced in this manner is now cut into small rods or elements by vertical cuts which are oriented crosswise to the glass-silk fabric inserts. The width and height of the rods depends on the desired mechanical strength and, in case plastics with specific high-frequency properties are used, also on the demands made on the absorber.

Figure 8:
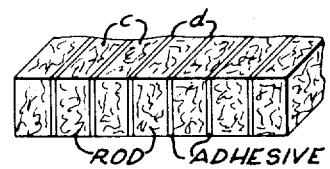
FIGURE 8 illustrates in perspective view and partially broken away the preferred construction for an element of the building material provided in accordance with the invention.
Figure 9:
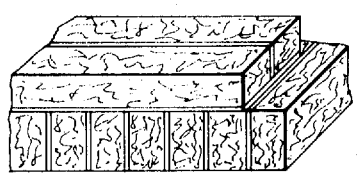
FIGURE 9 illustrates one preferred mode of application of the construction of FIG. 1.

FIG. 8 shows a plate consisting of narrow rods $c$, which are cemented together by means of a suitable adhesive $d$. Adhesives best suited for this purpose are those of an ethoxylene base. If higher demands are made on the dielectric or perforating strength of the material, a second building plate, similar to the first one, is mounted on the first one in a manner as shown in FIG. 9 with the direction of the rods of the first and second plates arranged crosswise to each other.

Figure 10:
FIGURE 10 illustrates in side sectional view a combination of the structural elements of FIGS. 7 and 8.
Figure 11:
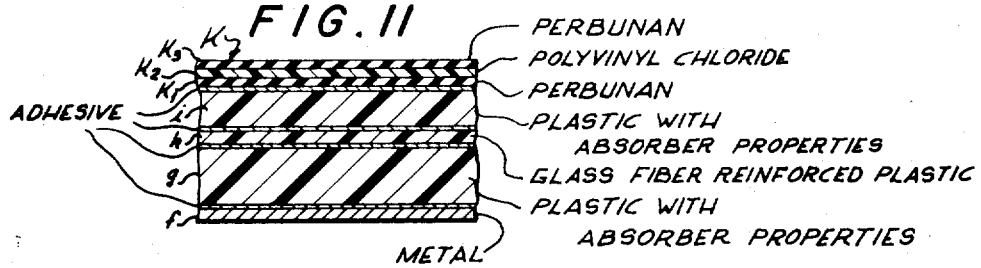
FIGURE 11 illustrates a further embodiment of the invention.

FIG. 10 shows an embodiment in which a thin plate $e'$ of about 5 mm. thickness according to FIG. 7 is glued or cemented on a plate $e$ according to FIG. 8.

FIG. 11 shows a radar- and shell-proof building material according to the invention with a somewhat complicated layer structure. The material consists of a 2 mm. metal-substitute plastic layer $f$ with absorber properties of, for example, relative dielectric constant $\epsilon=100$, and dielectric loss tangent of dissipation factor tan $\delta\epsilon=0.8$. On top of this layer there is positioned a 20 mm. plastic plate $g$ of the type shown in FIG. 8 with absorber properties of, for example, $\epsilon=4$ and tan $\delta\epsilon=0.01$. Above this a thinner intermediate plastic layer $h$ reinforced with glass-silk fabric according to FIG. 7, and a second 10 mm. thick plastic layer $i$ (structure according to FIG. 8) having the same absorber properties as layer $g$ are placed. The rods or elements of the two layers $g$ and $i$ run crosswise to each other. Finally, the actual electromagnetic wave absorber layer $k$ is superposed, this layer consisting of three partial layers, the bottom layer $k1$ being similar to layer 23 and containing Perbunan and having a thickness of 0.8 mm., layer $k2$ being formed of a polyvinyl chloride foil having a thickness of 2 mm., and layer $k3$ being a Perbunan absorber layer similar to layer 24 and having a thickness of 1.2 mm. The separate layers are cemented on top of each other with an adhesive.

The construction of the building material of the invention with radar properties can be carried out in many different ways and depends on whether a multi-circuit or single-circuit absorber is desired.

The building material according to the invention may be used in the construction of armored vehicles, as well as in the construction of ships and aircraft.

Building plates of the invention can be used not only for the production of electromagnetic wave absorbers, for which plastics with high-frequency losses are required, but also in many other cases where the mechanical properties of the products are to be utilized.

What is claimed is:

1. A structural member which is adapted for absorbing an electromagnetic wave of a particular wavelength, said member comprising an absorber of electromagnetic wave energy, and a base supporting said absorber and constituted by at least one layer of reinforced plastic material, said absorber being constituted by a plurality of plastic layers, and a metallic insert in at least one layer; the metallic insert being a wire net.

2. A structural member which is adapted for absorbing an electromagnetic wave of a particular wavelength, said member comprising an absorber of electromagnetic wave energy, and a base supporting said absorber and constituted by at least one layer of reinforced plastic material, said absorber being constituted by a plurality of plastic layers, and a wire net on at least one of said layers.

3. Plastic building material with high mechanical strength comprising a plastic layer including and reinforced by fibers in the form of narrow rods bound together, the width and height of the rods determining the strength of the material and the absorber characteristics thereof, and absorber means on said plastic layer for absorbing electromagnetic waves of desired frequency; and a second layer on the first said layer between the latter and the absorber means, said second layer including and reinforced by fibers in the form of narrow rods bound together, said layers being superimposed with their rods overlapping crosswise.

4. Building material with high mechanical strength and comprising a plurality of superposed layers, a first of said layers being a thin plastic layer and having electromagnetic energy absorber characteristics, a second of said layers being a thicker plastic layer, a third of said layers being a thin intermediate layer of plastic material including and reinforced by inserts of fibers. a fourth of said layers being a second plastic layer having the same absorber characteristics as the first of said layers, said first and fourth layers including rods and being superposed with the respective rods crosswise, and a fifth of said layers being a radar absorber layer including three partial layers constituted respectively as a thin bottom layer of plastic material with said absorber characteristics, a thicker middle layer of thermoplastic material, and a top layer with said absorber characteristics.

References Cited

UNITED STATES PATENTS

| | | | |
|---|---|---|---|
| 2,771,602 | 11/1956 | Kuhnhold | 343—18 |
| 2,828,484 | 3/1958 | Skellett | 343—18 |
| 2,875,435 | 2/1959 | McMillan | 343—18 |
| 2,951,247 | 8/1960 | Halpern et al. | 343—18 |

RODNEY D. BENNETT, JR., *Primary Examiner.*

B. L. RIBANDO, *Assistant Examiner.*